US010707664B2

(12) United States Patent
Segro et al.

(10) Patent No.: US 10,707,664 B2
(45) Date of Patent: Jul. 7, 2020

(54) ENCLOSURE AND FACE PLATE SUPPORT MEMBER FOR USE WITH THE ENCLOSURE

(71) Applicant: Integra Enclosures, Limited, Mentor, OH (US)

(72) Inventors: Bradley A. Segro, Fairport Harbor, OH (US); James C. McWilliams, Jr., West Chester, OH (US)

(73) Assignee: INTEGRA ENCLOSURES, LIMITED, Mentor, OH (US)

( * ) Notice: Subject to any disclaimer, the term of this patent is extended or adjusted under 35 U.S.C. 154(b) by 0 days.

(21) Appl. No.: 16/684,134

(22) Filed: Nov. 14, 2019

(65) Prior Publication Data

US 2020/0083689 A1   Mar. 12, 2020

Related U.S. Application Data

(62) Division of application No. 15/480,073, filed on Apr. 5, 2017, now Pat. No. 10,516,256.

(51) Int. Cl.
*H02G 3/08* (2006.01)
*H02G 3/14* (2006.01)
*H02G 3/10* (2006.01)

(52) U.S. Cl.
CPC ............... *H02G 3/14* (2013.01); *H02G 3/10* (2013.01)

(58) Field of Classification Search
CPC ........... H02G 3/08; H02G 3/081; H02G 3/10; H02G 3/14; H05K 5/00; H05K 5/02; H05K 5/0217; H05K 5/0247; H01R 13/46

USPC ....... 174/50, 53, 57, 58, 480, 481, 535, 542, 174/59, 61; 220/3.2–3.9, 4.02; 248/906, 248/200, 205.1, 220.1, 220.21, 223.41; 312/223.1
See application file for complete search history.

(56) References Cited

U.S. PATENT DOCUMENTS

| 5,084,596 A | * | 1/1992 | Borsh | H02G 3/18 |
| | | | | 174/53 |
| 5,245,507 A | * | 9/1993 | Ericksen | H02B 1/28 |
| | | | | 174/67 |
| 6,469,247 B1 | | 10/2002 | Dodds | |
| 6,604,798 B1 | * | 8/2003 | Cooney | H02G 3/14 |
| | | | | 174/53 |
| 6,642,446 B2 | | 11/2003 | Dodds | |

(Continued)

*Primary Examiner* — Angel R Estrada
(74) *Attorney, Agent, or Firm* — Welgman Hessler

(57) ABSTRACT

An enclosure system includes a box with a base and four sidewalls, and a support member having opposite first and second ends and defining a longitudinal axis between the opposite first and second ends for supporting components within the box. A component interface portion is formed on the first end, and an enclosure interface portion is formed on the second end. The component interface portion defines a first connection region for selective connection with a component to be located in the box, and the enclosure interface portion defines a non-circular cylindrical locating region for engagement with a corresponding oppositely formed non-circular cylindrical locating region on the base of the box. The engagement between the non-circular cylindrical locating region and the oppositely formed non-circular cylindrical locating region on the base of the box prevents rotational movement of the elongate body member about the longitudinal axis relative to the box.

6 Claims, 11 Drawing Sheets

(56) References Cited

U.S. PATENT DOCUMENTS

| | | | |
|---|---|---|---|
| 8,119,909 B2* | 2/2012 | Sonntag | H02G 3/18 |
| | | | 174/50 |
| 9,247,658 B2 | 1/2016 | McWilliams | |
| 10,516,256 B2* | 12/2019 | Segro | H02G 3/14 |

* cited by examiner

ENCLOSURE AND FACE PLATE SUPPORT MEMBER FOR USE WITH THE ENCLOSURE

CROSS-REFERENCE TO RELATED APPLICATIONS

This application is a divisional application of U.S. Non-Provisional patent application Ser. No. 15/480,073 filed Apr. 5, 2017, and entitled ENCLOSURE AND FACE PLATE SUPPORT MEMBER FOR USE WITH THE ENCLOSURE, which is herein incorporated by reference in its entirety.

TECHNICAL FIELD

The embodiments herein relate generally to enclosures, more particularly, to enclosures for mechanical, electrical, electronic components, and associated wiring and circuitry, and to support members for supporting face plates and other components and items within these enclosures.

BACKGROUND

Enclosures are commonly used to provide a degree of protection to personnel against incidental contact with enclosed equipment and to provide a degree of protection against the surrounding environment for enclosed equipment. Typical enclosures include a box, a hinged door sealed to the box when in a closed position, and mounting pieces for supporting the enclosed equipment at selected positions within the box. Frequent access to the components within such enclosures is common for adjustments, maintenance, and inspection of the components. Components within the enclosure may also be changed or replaced as the demand therefor changes. Typically, the components are fastened to a panel inside the enclosure. Panels and components must typically be dismounted from the interior of the enclosure and replaced by other components. Further, enclosures are often used to house many different electronic and/or electric components and their associated wiring and control circuitry. These components, their associated wiring, and the panels all come in varying shapes and sizes. Still further, the components must be fastened in place and often several different components must be mounted rigidly in the same housing and/or in a fixed spatial relationship therefore flexibility in component placement is important.

Oftentimes, the total production run of any one particular combination of components is somewhat limited and the cost of producing a custom enclosure is not economically justified. In such instances, enclosures having an ability to be adapted to different component mounting arrangements are used. Similarly, when performing field installation of various electrical wiring and control systems, it is often necessary to install many different combinations of components. In order to maintain the number of different enclosures required to a reasonable level, it is desirable to have enclosures which are extremely flexible in that they are able to accommodate a wide variety of components and mounting arrangements.

Some enclosures include means to accommodate multiple components and mounting arrangements yet suffer from a number of drawbacks. For example and as shown in FIG. 1, an enclosure 1 in the shape of a box 10 may include one or more fixed tracks 12 which extend from the bottom 14 to the top 16 of the enclosure 1. Mounting brackets (not shown) which hold electrical components or the like may be slid inwardly and outwardly relative to the box along the track 12 until a desired position is attained. A tool may then be inserted through a front face of the enclosure to access one or more fasteners positioned at right angles to the side walls of the enclosure 1 and which, when tightened, engage the side wall to secure the bracket to the track. The one or more tracks 12, however, when not used or otherwise needed in some applications add unnecessary cost and weight to the enclosure 1. In these situations the one or more tracks 12 also consume space in the box 10 that otherwise could be used to accommodate additional multiple components and/or enable further diverse mounting arrangements. It would therefore be useful for the one or more tracks 12 to be removable from the box as may be necessary or desired in the field during use of the enclosure.

Another undesirable aspect of such mounting structure is that the mounting brackets (not shown) which hold electrical components or the like and that may be slid to and fro along the track 12 until a desired position is attained are typically held in place relative to the bottom 14 of the box 10 by a threaded insert 18 disposed at the bottom 14 and formed integrally with the box 10 during manufacture thereof. The one or more threaded inserts 18, however, also add cost and weight to the enclosure 1. It would therefore be desirable to provide a system that can be used for mounting various components within the box that does not need or otherwise require the one or more threaded inserts 18 disposed at the bottom 14 and formed integrally with the box 10 during manufacture.

SUMMARY OF THE EXAMPLE EMBODIMENTS

Broadly, the present application provides an enclosure in the form of a box, a removable support member for use in the box, and an enclosure including a box and a removable support member in the box. The box has a base, four sidewalls, and an open top face which may be closed by a locking cover plate or lid over its open top face. The enclosure may include removable mounting brackets selectively non-rotatably matable with the base and/or sidewalls of the box for carrying components and other items within the box as may be necessary and/or desired.

In accordance with one aspect of the example embodiments, an enclosure system includes a box and a support member, the support member being selectively inserted into the box for carrying items and components such as support plates in the box and the support member being selectively removable from the box as may be necessary and/or desired. In an example. embodiment the box includes a base and four sidewalls extending from the base. The base and the four sidewalls define an open end of the box which may be closed by a lid or the like for covering items and/or components located in the box. Further in the example embodiment, the support member includes an elongate body member having opposite first and second ends. The elongate body member defines a longitudinal axis L between the opposite first and second ends, and a component interface portion formed on the first end of the elongate body member, and an enclosure interface portion formed on the second end of the elongate body member. The component interface portion defines a first connection region for selective connection of the first end of the elongate body member with an associated component to be located in the box, and the enclosure interface portion defines a locating region on the second end of the elongate body member for selective engagement of the second end of the elongate body member with a corresponding oppositely formed locating region on the base of the box.

In accordance with a further aspect of the example embodiments, the enclosure includes removable mounting brackets selectively non-rotatably matable with the base and/or sidewalls of the box for carrying components and other items within the box as may be necessary and/or desired. In one form for providing against rotation between the support member and the box, the locating region on the enclosure interface portion of the support member specially engages with a corresponding oppositely formed locating region on the base of the box. In another form for providing against rotation between the support member and the box, one or more walls of the support member define alignment surfaces that are specially shaped to selectively engage the sidewalls of the box when the support member is carried in the box. In yet another form for providing against rotation between the support member and the box, both the locating region on the enclosure interface portion of the support member specially engages with the corresponding oppositely formed locating region on the base of the box when the support member is carried in the box, and the one or more alignment surfaces engage the sidewalls of the box when the support member is carried in the box.

In accordance with a further aspect of the example embodiments, the enclosure interface portion of the support member defines a non-circular cylindrical locating region on the second end of the elongate body member for selective engagement of the second end of the elongate body member with a corresponding oppositely formed non-circular cylindrical locating region on the base of the box of the enclosure system. The selective engagement between the non-circular cylindrical locating region of the enclosure interface portion and the oppositely formed non-circular cylindrical locating region on the base of the box prevents rotational movement of the elongate body member about the longitudinal axis of the support member relative to the box.

In accordance with a further aspect of the example embodiments, the enclosure interface portion includes an annular wall formed on the second end of the elongate body member, and the non-circular cylindrical locating region on the second end of the elongate body member is defined by plural inwardly directed surfaces of the annular wall adapted for selective engagement with a corresponding plurality of oppositely formed outwardly directed surfaces defined by a boss on the base of the box.

The selective engagement between the plural inwardly directed surfaces of the annular wall and the oppositely formed outwardly directed surfaces on the base of the box prevents rotational movement of the elongate body member about the longitudinal axis of the support member relative to the box.

In accordance with a still further aspect of the example embodiments, the elongate body member defines first and second walls extending substantially in parallel with the longitudinal axis L of the elongate body member. The first wall defines a first alignment surface being configured for abutting contact with a first sidewall of the four sidewalls of the box when the locating region of the body member is selectively engaged with the corresponding oppositely formed locating region on the base of the box. Similarly, the second wall of the body member defines a second alignment surface being configured for abutting contact with a second sidewall of the four sidewalls of the box when the locating region is selectively engaged with the corresponding oppositely formed locating region on the base of the box. In this way, the selective abutting contact between first and second alignment surfaces with the first and second sidewalls of the four sidewalls of the box when the locating region is selectively engaged with the corresponding oppositely formed locating region on the base of the box prevents the rotational movement of the elongate body member about the longitudinal axis L relative to the box.

In accordance with still yet a further aspect of the example embodiments, the enclosure interface portion of the body member defines a non-circular cylindrical locating region on the second end thereof for selective engagement of the second end of the elongate body member with a corresponding oppositely formed non-circular cylindrical locating region on the base of the box. The elongate body member further defines first and second walls extending substantially in parallel with the longitudinal axis of the body member. the first wall defines a first alignment surface being configured for abutting contact with a first sidewall of the box when the non-circular cylindrical locating region is selectively engaged with the corresponding oppositely formed non-circular cylindrical locating region on the base of the box, and the second wall defines a second alignment surface being configured for abutting contact with a second sidewall of the box when the non-circular cylindrical locating region is selectively engaged with the corresponding oppositely formed non-circular cylindrical locating region on the base of the box. In this way, the selective engagement between the non-circular cylindrical locating region of the enclosure interface portion and the oppositely formed non-circular cylindrical locating region on the base of the box, together with the selective abutting contact between first and second alignment surfaces with the first and second sidewalls of the four sidewalls of the box when the non-circular cylindrical locating region is selectively engaged with the corresponding oppositely formed non-circular cylindrical locating region on the base of the box prevents the rotational movement of the elongate body member about the longitudinal axis of the body member relative to the box.

Features that are described and/or illustrated with respect to one embodiment may be used in the same way or in a similar way in one or more other embodiments and/or in combination with or instead of the features of the other embodiments. the particular vehicle pair.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE SEVERAL VIEWS OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF THE EXAMPLE EMBODIMENTS

Figure 1:
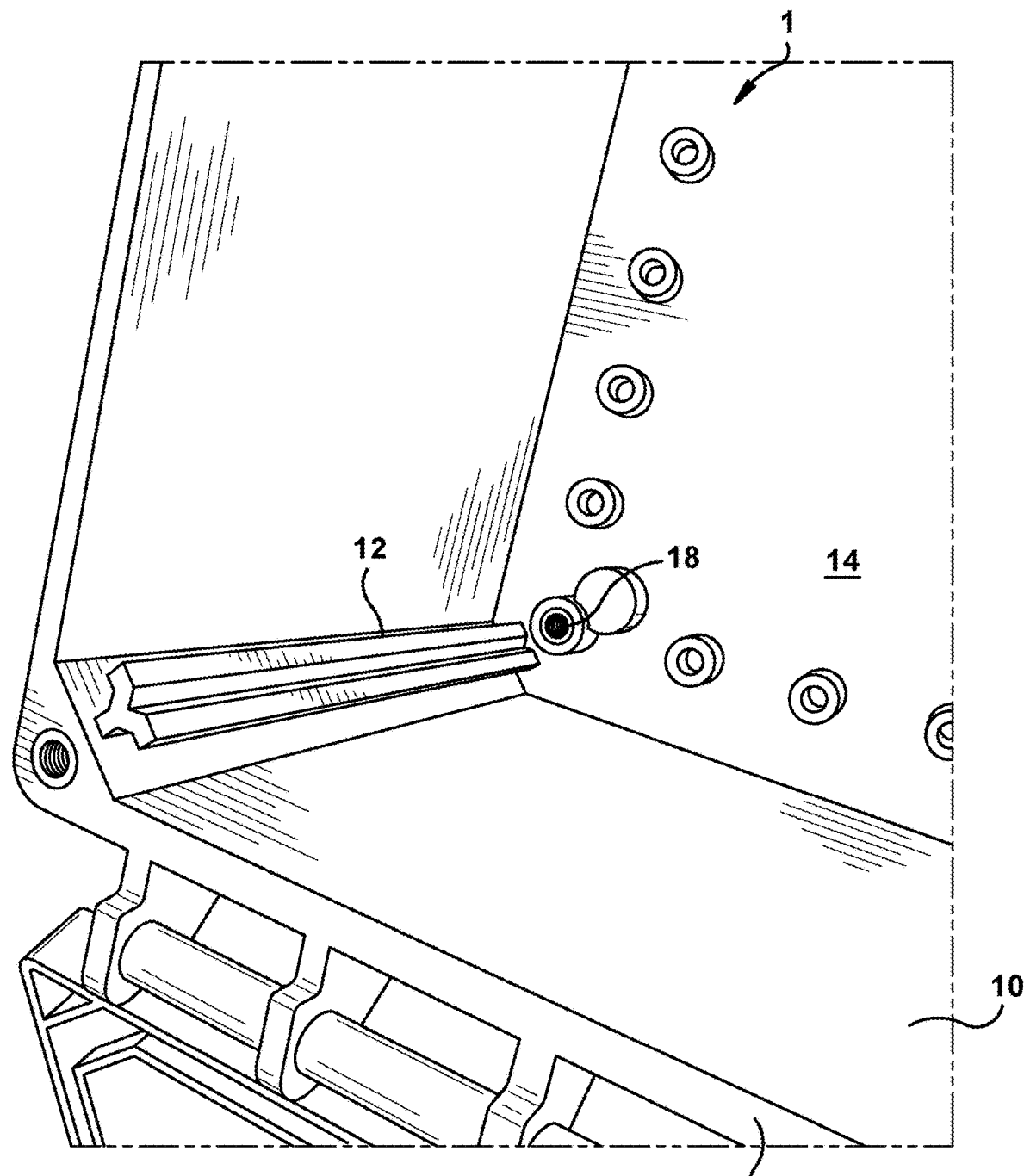
FIG. 1 is an isometric diagram illustrating an exemplary enclosure assembly with the door removed in accordance with aspects of the prior art.

The example embodiments of the claimed invention will now be described with reference to the drawings, wherein like reference numerals are used to refer to like elements throughout. The terms "vertical" and "horizontal" along with any other directional terminology are used herein in reference to an enclosure having sidewalls disposed on the "sides" and having a door facing "up" and a base facing "down." The installed orientation of the box may be different from this illustrative description without departing from the concepts taught herein.

The example embodiments of the claimed invention may be utilized in a variety of contexts including, for example, junction boxes and cut-out boxes designed for use in electrical construction, water treatment, car wash, telecommunication, instrumentation, utilities, machine buildings, HVAC applications, and the like.

Figure 2:
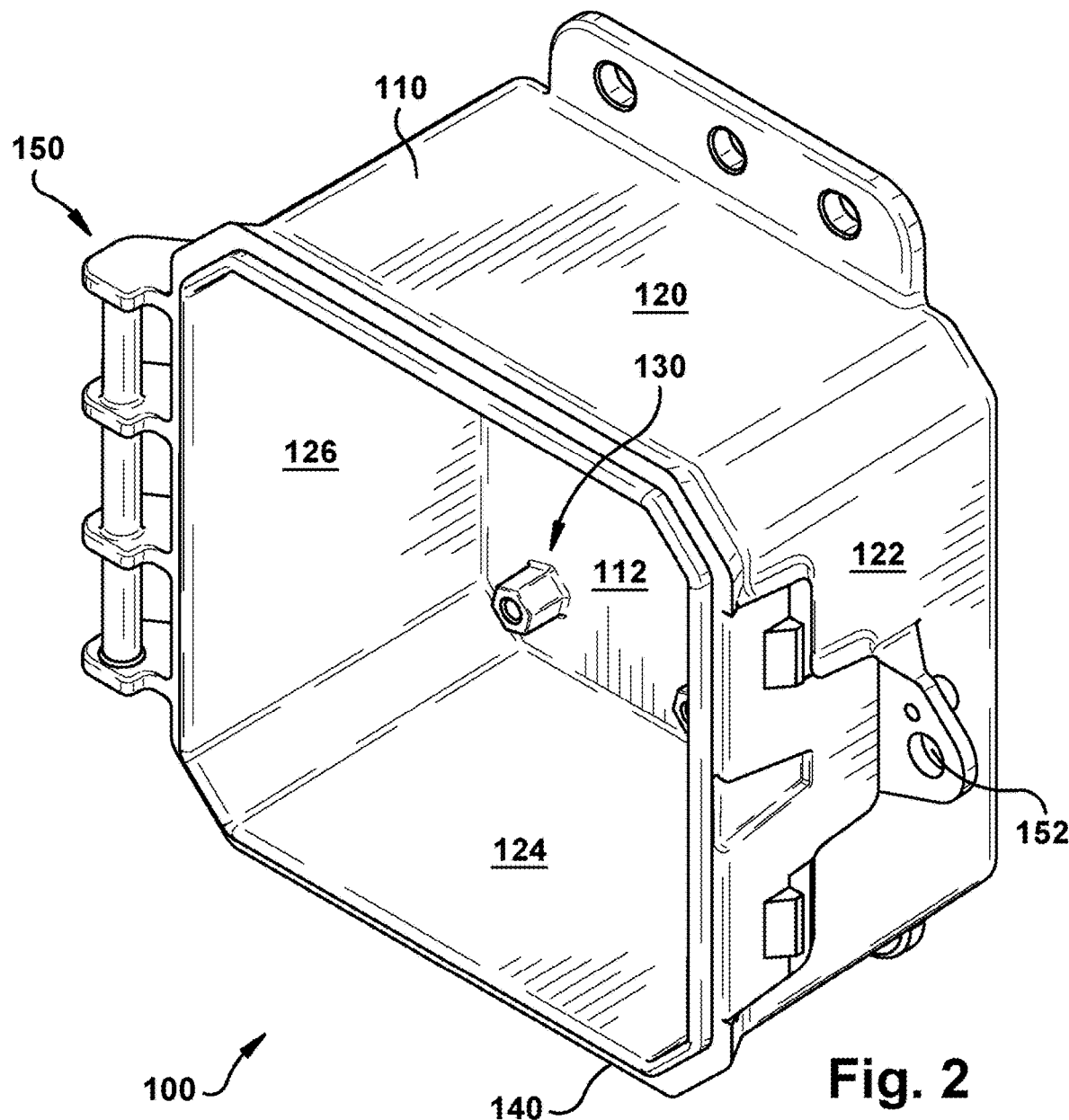
FIG. 2 is an isometric diagram illustrating an exemplary box of an exemplary enclosure assembly with the door removed in accordance with aspects of a example embodiment.
Figure 3:
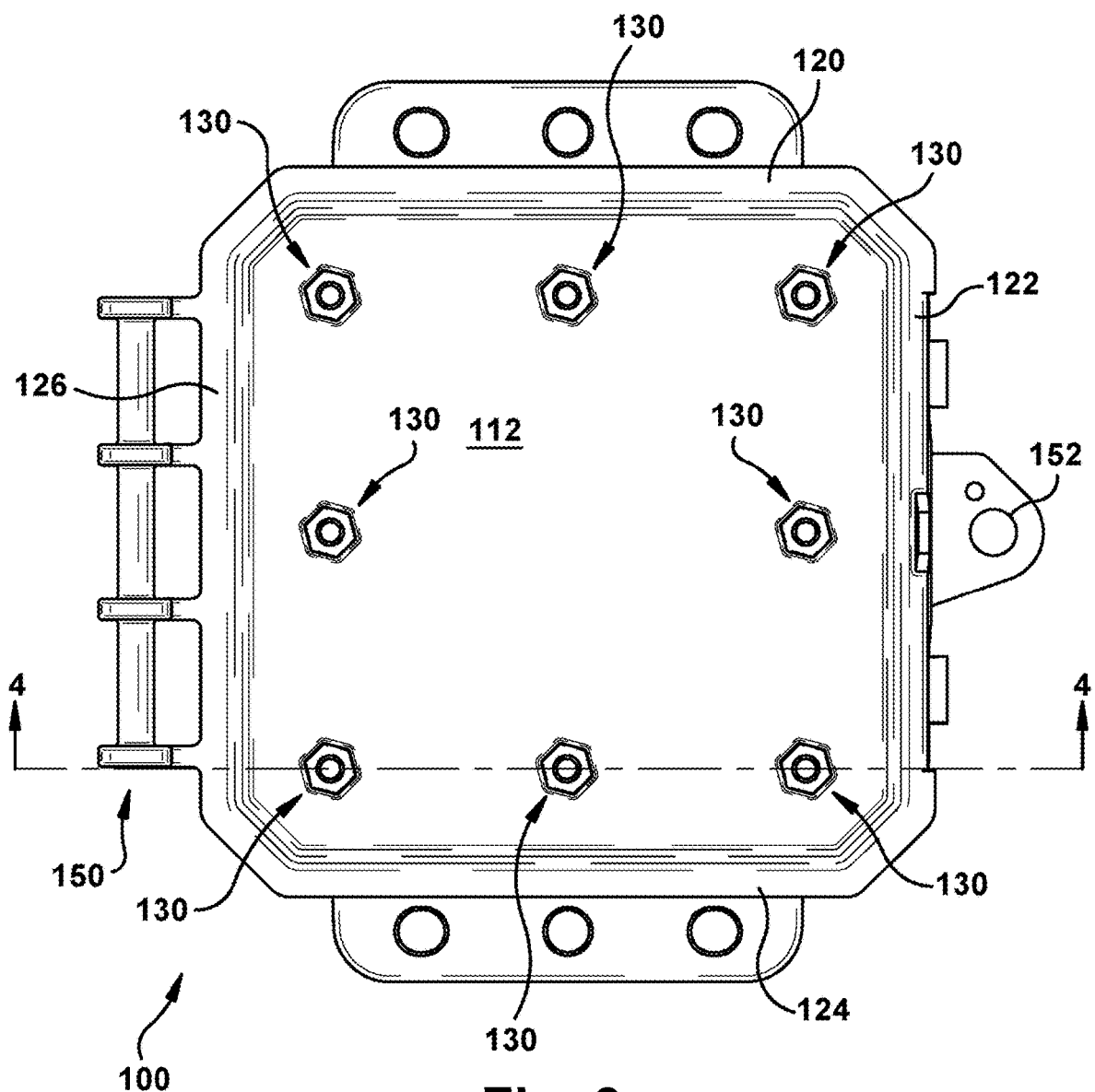
FIG. 3 is an orthographic top-view illustrating the box of the exemplary enclosure assembly of FIG. 2, showing aspects of an example embodiment.
Figure 4:
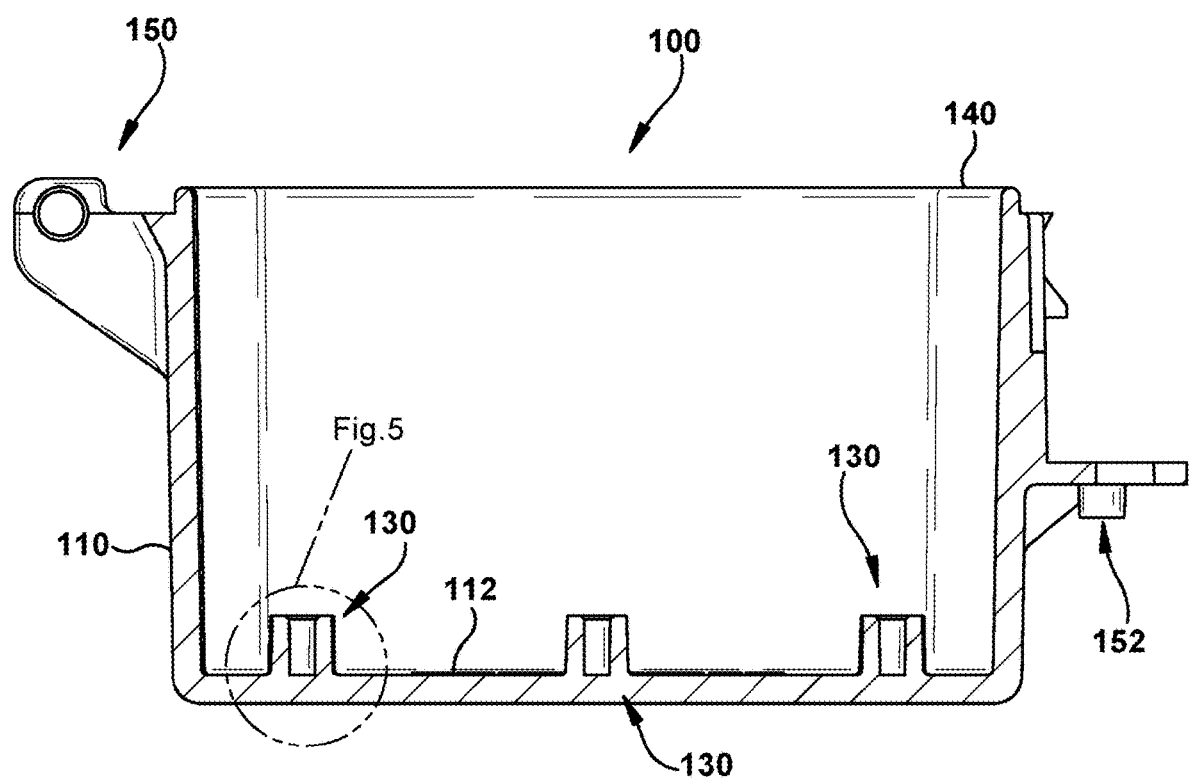
FIG. 4 is a cross-sectional view of the box of the exemplary enclosure assembly of FIGS. 2 and 3 taken along line 4-4 of FIG. 3, showing aspects of an example embodiment.
Figure 5:
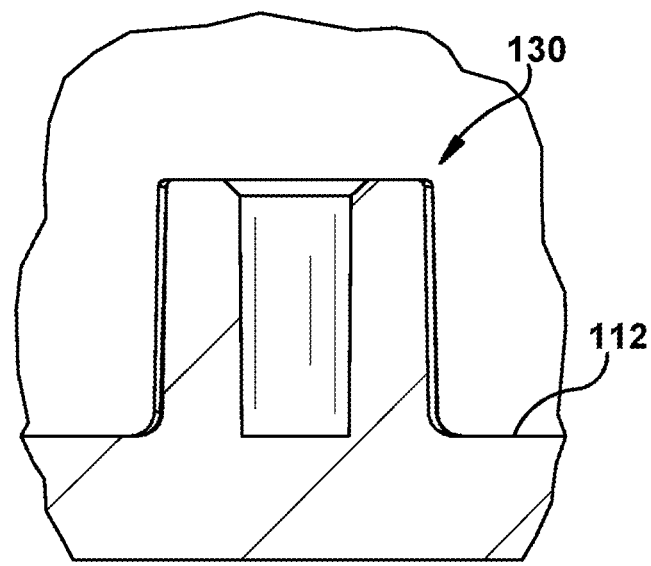
FIG. 5 is an enlarged view of the portion 5-5 of FIG. 4 showing aspects of an example embodiment.
Figure 6:
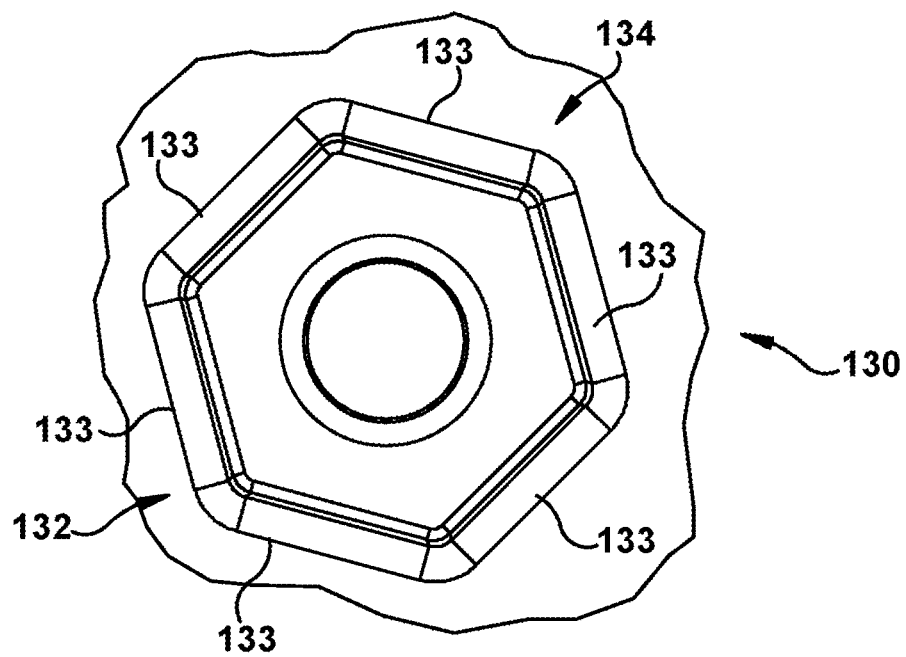
FIG. 6 is an enlarged view of the portion 6-6 of FIG. 3 showing aspects of an example embodiment.

Referring now to the drawings, wherein the showings are for purposes of illustrating the example embodiments only and not for purposes of limiting same, FIGS. 2 and 3 show an exemplary electrical enclosure 100 assembly in accordance with an example embodiment of the claimed invention for enclosing electrical components and the like. The exemplary electrical enclosure 100 assembly in accordance with the example embodiment includes a box 110 comprising a base 112 and four sidewalls 120, 122, 124, 126 extending from the base 112. The base 112 of the box 110 defines one or more locating regions 130 for selective intermatable coupling with a corresponding one or more support members (not shown) in a manner to be described in greater detail below. In the embodiment illustrated, the base 112 of the box 110 defines eight (8) locating regions 130 for selective intermatable coupling with a corresponding set of support members 900 (three (3) shown in the box 110 of FIG. 8) in a manner to be described in greater detail below. It is to be appreciated that each of the support members 900 is selectively removable from the box 110 thereby freeing space within the box for use by other components as deemed necessary or desired, and further that any number of support members may be used as necessary and/or desired. It is very useful for the one or more support members to be removable from the box as may be necessary or desired in the field during use of the enclosure making the overall enclosure system 100 very flexible.

Figure 7:
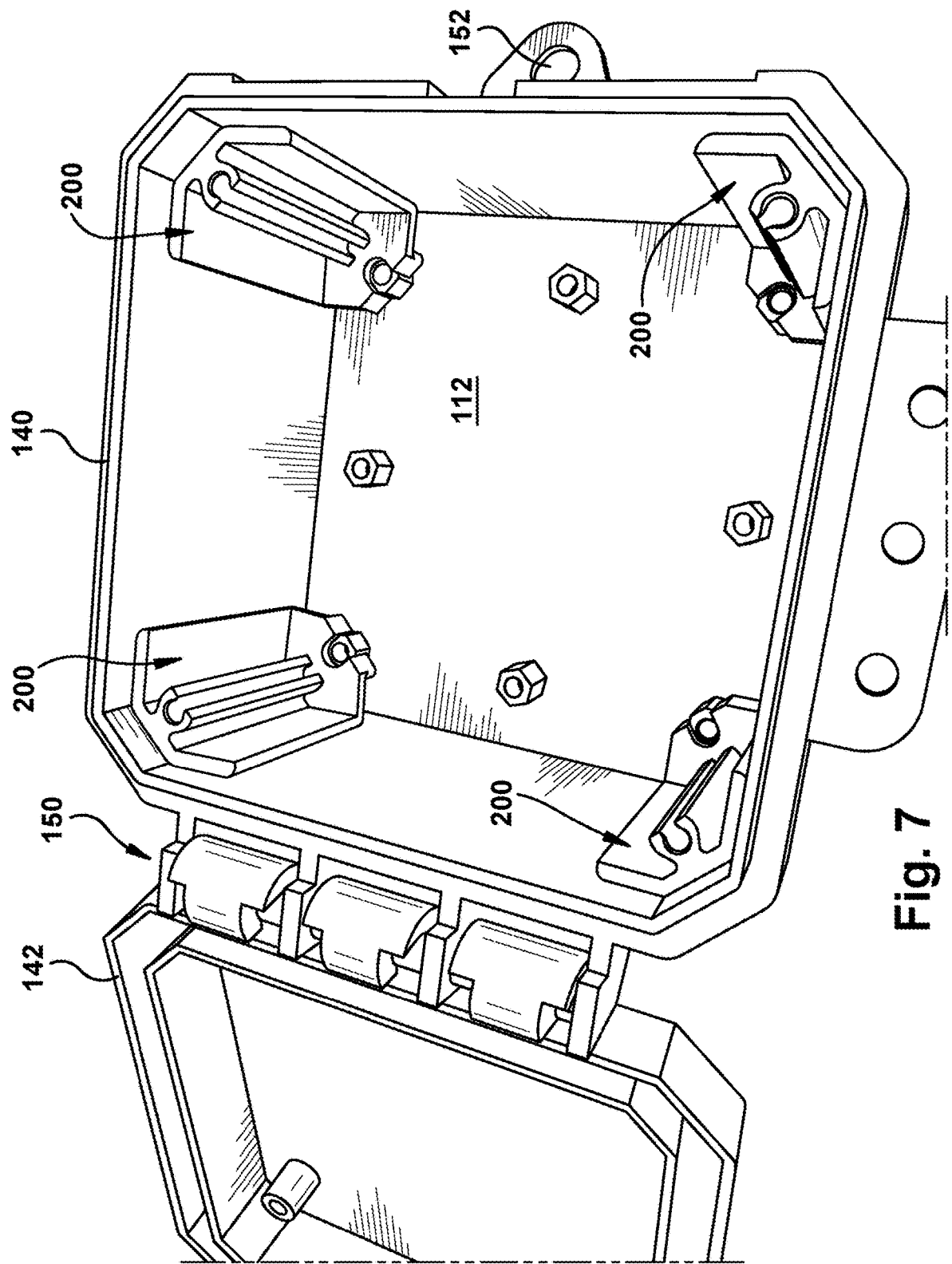
FIG. 7 is an isometric diagram illustrating the exemplary enclosure assembly of FIGS. 2-4 with a set of four (4) support members located in the box of the assembly in accordance with aspects of an example embodiment.
Figure 8:
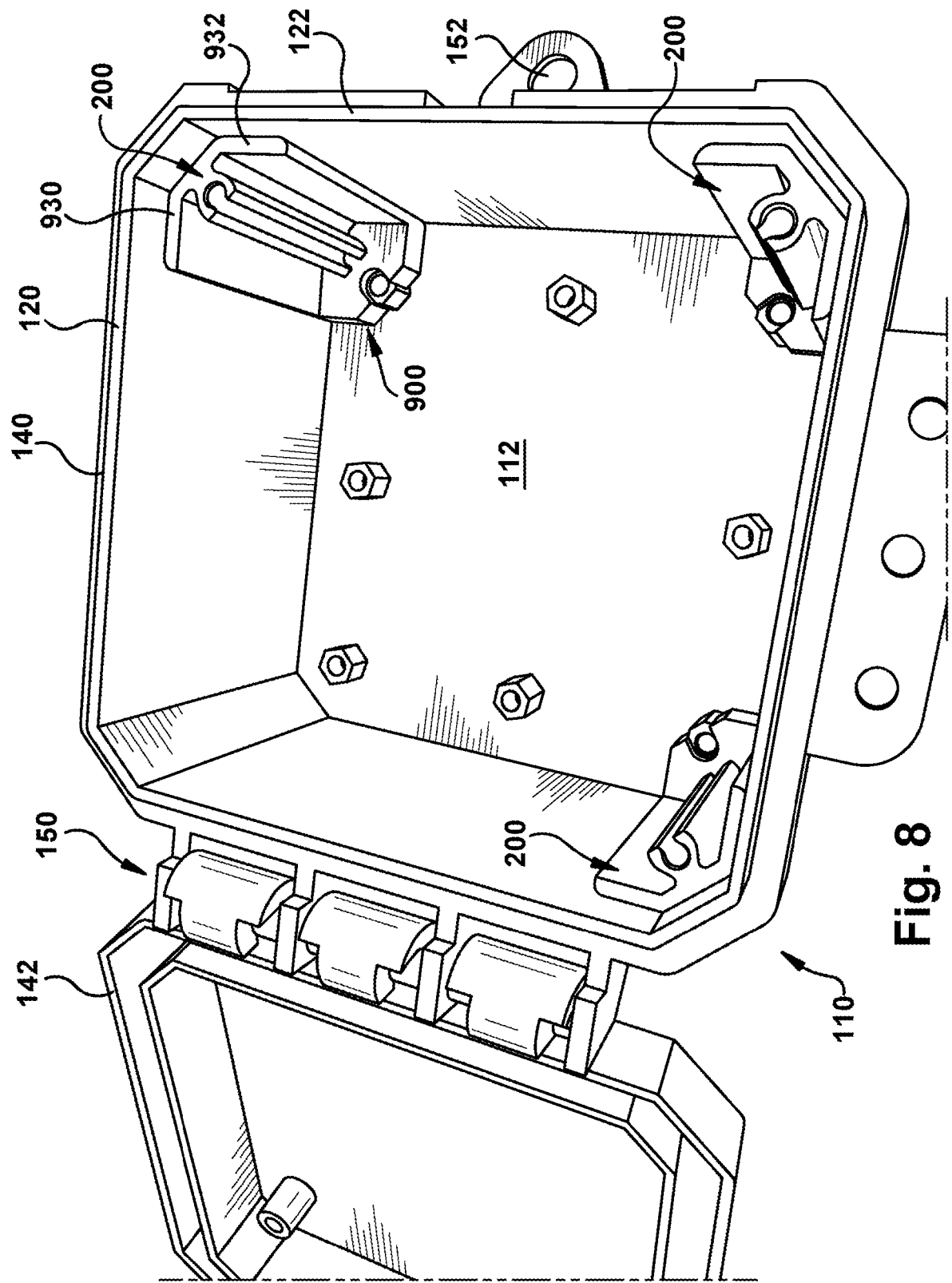
FIG. 8 is an isometric diagram illustrating the exemplary enclosure assembly with of FIG. 7 with a support member removed leaving a set of three (3) support members located in the box of the assembly in accordance with aspects of an example embodiment.

The base 112 and the four sidewalls 120-126 define an open end 140 of the box 110 which may be closed by a top cover or door 142 (FIGS. 7 and 8} for covering items/components located in the box 110. The enclosure top cover or door 142 may be attached to one of the four sidewalls 120-126 by one or more latches (not shown) and/or by one or more hinges 150, which may cover the opening 140 when the door 142 is in a closed position.

The door 142 may be attached using any fastening system known to one skilled in the art. The door may include, for example, one or more grooves or steps which provide an attachment surface for the latches. The latches may, for example, be unitarily molded and utilize elastic deformation of the fastener to allow movement for engaging and disengaging with the attachment surfaces, as is known in the art. Alternatively, for example, the latches may include separate hinge and latching mechanisms known by one skilled in the art.

Additionally, the door 142 may be attached to one of the four sidewalls 120-126 by one or more hinges 150 allowing the door 142 to pivot between an open position and a closed position. When in an open position, the hinge 150 allows the door 142 to move out of the way of the opening 140, while remaining fixed to the box 110 to, for example, prevent loss of the door 142 or present, to a user, information affixed to the inside of the door, for example, a schematic (not shown} illustrating the contents of the enclosure 100.

Further, the door 142 may include a door lock aperture (not shown} for securing the door 142 to the box 110 in a closed position with a lock (not pictured} which may pass through the door lock aperture (not shown} and a complimentary, juxtaposed body lock aperture 152.

The exemplary electrical enclosure 100 assembly in accordance with the example embodiment of the claimed invention is configured to receive one or more support members 200 for supporting electrical components and the like within the enclosure 100. In this connection, the base 112 of the box 110 defines one or more locating regions 130 for selective intermatable coupling with a corresponding one or more of the support members 200 for preventing rotation of the support members 200 about a longitudinal axis L thereof and relative to the box in a manner to be described in greater detail below. Similarly, the sidewalls 120, 122, 124, 126 of the box 110 define surfaces for abutting contact with walls of the one or more of the support members 200 for preventing rotation of the support members 200 about a longitudinal axis L thereof and relative to the box in a manner to be described in greater detail below.

In the example embodiments, the non-rotational coupling of the support members 200 relative to the box of the enclosure is provided by contact between the locating regions of the support members with similar locating regions on the base of the box when the locating region of the support member is selectively engaged with the corresponding oppositely formed locating region on the base of the box. In further example embodiments, the non-rotational coupling of the support members 200 relative to the box of the enclosure is provided by contact between wall surfaces of the support members with similar locating regions on the sidewalls of the box when the locating region of the support member is selectively engaged with the corresponding oppositely formed locating region on the base of the box. In still further example embodiments, the non-rotational coupling of the support members 200 relative to the box of the enclosure is provided by both the contact between the locating regions of the support members with similar locating regions on the base of the box as well as by the contact between wall surfaces of the support members with similar locating regions on the sidewalls of the box when the locating region of the support member is selectively engaged with the corresponding oppositely formed locating region on the base of the box.

In one example embodiment, the one or more locating regions 130 is non-circular. In particular, the one or more locating regions 130 include a plurality of outwardly directed surfaces 133 defined by a boss 132 on the base 112 of the associated enclosure 110 for selective intermatable coupling with a corresponding one or more of the support members 200. In a further example embodiment, the plurality of outwardly directed surfaces 133 defined by the boss 132 on the base 112 of the associated enclosure 110 are also non-circular and define a hexagonal shape 134.

In a further example embodiment, the base 112 of the box 110 defines the one or more locating regions 130 for selective intermatable coupling with a corresponding one or more of the support members 200 in the form of a recess 132' defined in the base 112. In this example embodiment, the recesses 132' include a plurality of inwardly directed surfaces 133' defined by the recess 132' on the base 112 of the enclosure 110 for selective intermatable coupling with a boss 132' defined on ends of the one or more of the support members 200. In a further example embodiment, the plurality of inwardly directed surfaces 133' defined by the recess 132' on the base 112 of the associated enclosure 110 define a hexagonal shape 134'.

In the example embodiment illustrated, the enclosure system 100 comprises, in general, a box 110 and a support member 200. The box 110 comprises a base 112 and four sidewalls 120, 122, 124, 126 extending from the base 112. The base 112 and the four sidewalls 120, 122, 124, 126 define an open end 140 which may be closed by a lid 142 for covering items/components located in the box 110. A preferred form of the support member 900 comprises an elongate body member 900 having opposite first 902) and second 904 ends and defining a longitudinal axis L between the opposite first and second ends, a component interface portion 950 formed on the first end 902 of the elongate body member, an enclosure interface portion 960 formed on the second end 904 of the elongate body member. The component interface portion defines a first connection region 952 for selective connection of the first end of the elongate body member with an associated component to be located in the box 110, and the enclosure interface portion 960 defines a locating region 962 on the second end 904 of the elongate body member for selective engagement of the second end of the elongate body member with a corresponding oppositely formed locating region 130 on the base of the box.

In a particular form of the example embodiment, the enclosure interface portion 960 defines a non-circular cylindrical locating region 962 on the second end 904 of the elongate body member for selective engagement of the second end of the elongate body member with a corresponding oppositely formed non-circular cylindrical locating region 130 on the base of the box, wherein the selective engagement between the non-circular cylindrical locating region 962 of the enclosure interface portion 960 and the oppositely formed non-circular cylindrical locating region 130 on the base 112 of the box 110 prevents rotational movement of the elongate body member 900 about the longitudinal axis L relative to the box.

In one form, the enclosure interface portion 960 comprises an annular wall 970 on the second end 904 of the elongate body member 900, and the non-circular cylindrical locating region 962 on the second end of the elongate body member is defined by plural inwardly directed surfaces 972 of the annular wall 970 adapted for selective engagement with a corresponding plurality of oppositely formed outwardly directed surfaces 133 defined by a boss 132 on the base 112 of the box 110. In another form, the enclosure interface portion comprises a boss on the second end 904 of the elongate body member 900, and the non-circular cylindrical locating region 962 on the second end 904 of the elongate body member is defined on plural outwardly directed surfaces of the boss for selective engagement with a corresponding plurality of oppositely formed inwardly directed surfaces defined by a recess in the base 112 of the box 110.

In the particular form of the example embodiment, the elongate body member defines a first wall 930 extending substantially in parallel with the longitudinal axis L, the first wall defining a first alignment surface 934 being configured for abutting contact with a first sidewall 120 of the four sidewalls 120, 122, 124, 126 of the box when the locating region 962 is selectively engaged with the corresponding oppositely formed locating region 130 on the base of the box. Here, the elongate body member defines a second wall 932 extending substantially in parallel with the longitudinal axis L, the second wall defining a second alignment surface 936 being configured for abutting contact with a second sidewall 122 of the four sidewalls 120, 122, 124, 126 of the box when the locating region 962 is selectively engaged with the corresponding oppositely formed locating region 130 on the base of the box. It is to be appreciated that the selective abutting contact between first and second alignment surfaces 934, 936 with the first and second sidewalls 120, 122 of the four sidewalls 120, 122, 124, 126 of the box 110 when the locating region 962 is selectively engaged with the corresponding oppositely formed locating region 130 on the base 112 of the box 110 prevents the rotational movement of the elongate body member 900 about the longitudinal axis L relative to the box 110.

Yet still further in the particular form of the example embodiment, the enclosure interface portion 960 defines a non-circular cylindrical locating region 962 on the second end 904 of the elongate body member for selective engagement of the second end of the elongate body member with a corresponding oppositely formed non-circular cylindrical locating region 130 on the base 112 of the box 110, and the elongate body member 900 defines first and second walls 930, 932 extending substantially in parallel with the longitudinal axis L. The first wall 930 defines a first alignment surface 934 configured for abutting contact with a first sidewall 120 of the four sidewalls 120, 122, 124, 126 of the box 110 when the non-circular cylindrical locating region 962 is selectively engaged with the corresponding oppositely formed non-circular cylindrical locating region 130 on the base 112 of the box 110, and the second wall 932 defines a second alignment surface 936 configured for abutting contact with a second sidewall 122 of the four sidewalls 120, 122, 124, 126 of the box 110 when the non-circular cylindrical locating region 962 is selectively engaged with the corresponding oppositely formed non-circular cylindrical locating region 130 on the base 112 of the box 110. It is to be appreciated that the selective engagement between the non-circular cylindrical locating region 962 of the enclosure interface portion 960 and the oppositely formed non-circular cylindrical locating region 130 on the base 112 of the box 110 together with the selective abutting contact between first and second alignment surfaces 934, 936 with the first and second sidewalls 120, 122 of the four sidewalls 120, 122, 124, 126 of the box 110 when the non-circular cylindrical locating region 962 is selectively engaged with the corresponding oppositely formed non-circular cylindrical locating region 130 on the base 112 of the box 110 prevents the rotational movement of the elongate body member 900 about the longitudinal axis L relative to the box 110.

FIGS. 7 and 8 show boxes 110 of an enclosure 100 receiving a set of four (4) support members 200, and a set of three (3) support members 200, respectively. As illustrated, each of the support members 200 is operatively coupled with a non-circular cylindrical locating region formed on the base of the enclosure 100. In the example embodiment, each of the support members is selectively removable from the box 100 thereby freeing space within the box for use by other components as deemed necessary or desired.

Figure 9:
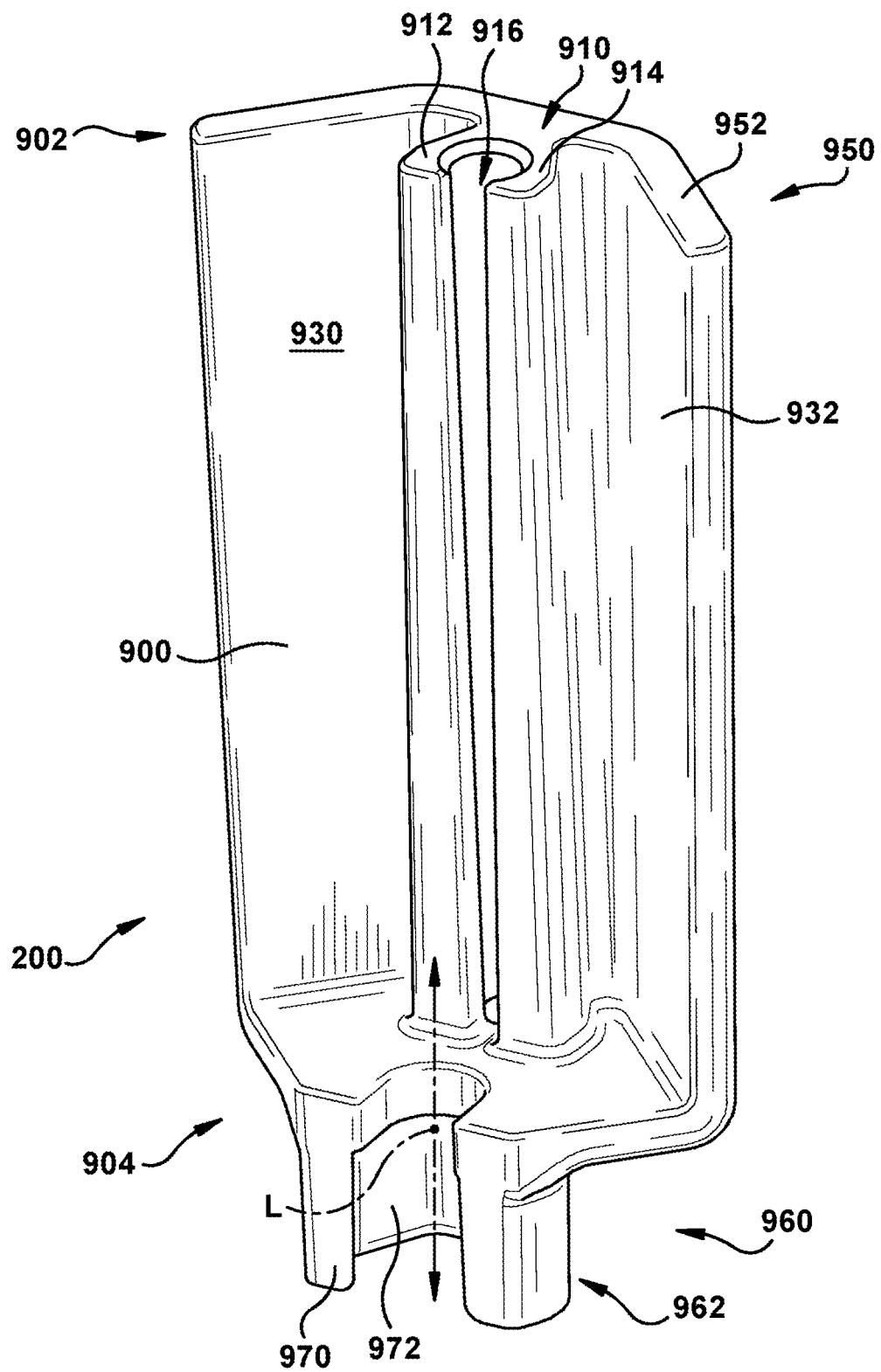
FIG. 9 is an isometric diagram illustrating a support member in accordance with an aspect of an example embodiment wherein first and second sidewalls defined by the body of the support member are mutually perpendicular.
Figure 10:
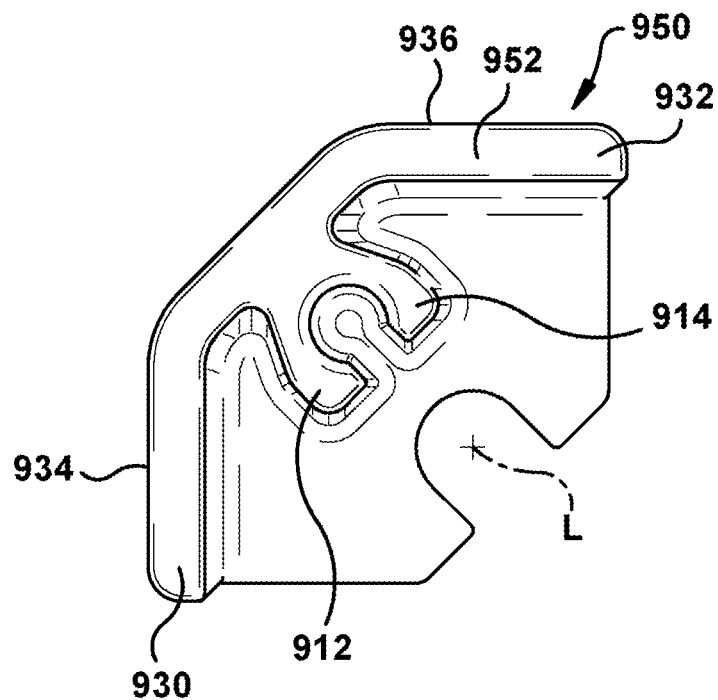
FIG. 10 is an orthographic top-view illustrating the support member of FIG. 9 showing aspects of an example embodiment.
Figure 11:
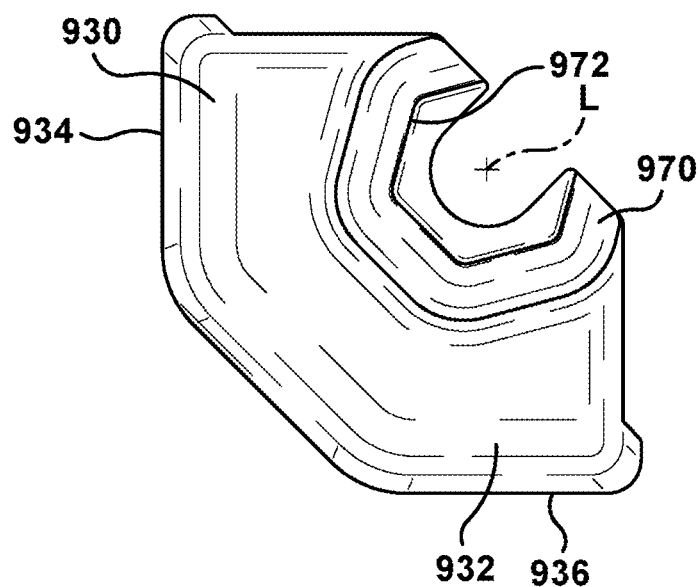
FIG. 11 is an orthographic bottom-view illustrating the support member of FIG. 9 showing aspects of an example embodiment.
Figure 10A:
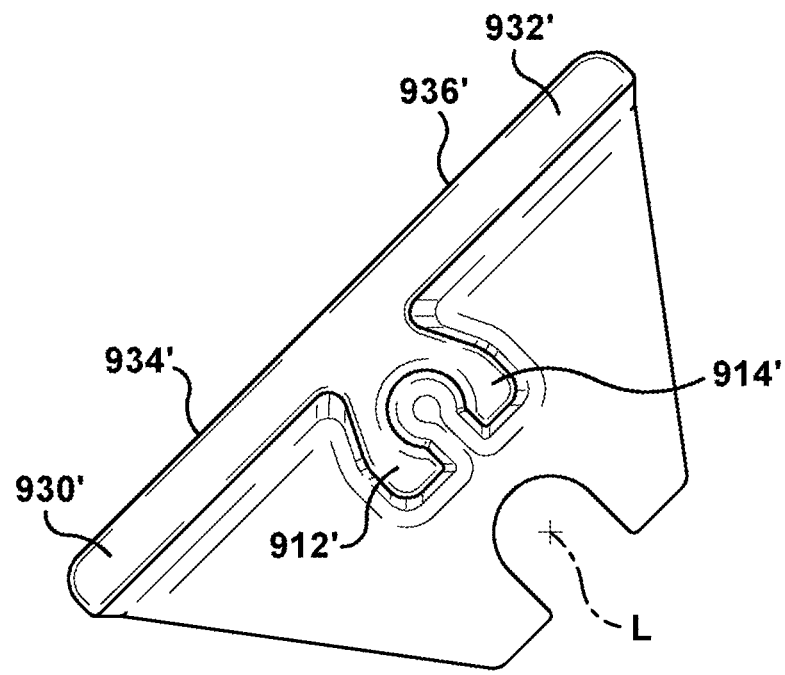
FIG. 10a is an orthographic top-view illustrating the support member of FIG. 9a showing aspects of the further example embodiment.
Figure 11A:
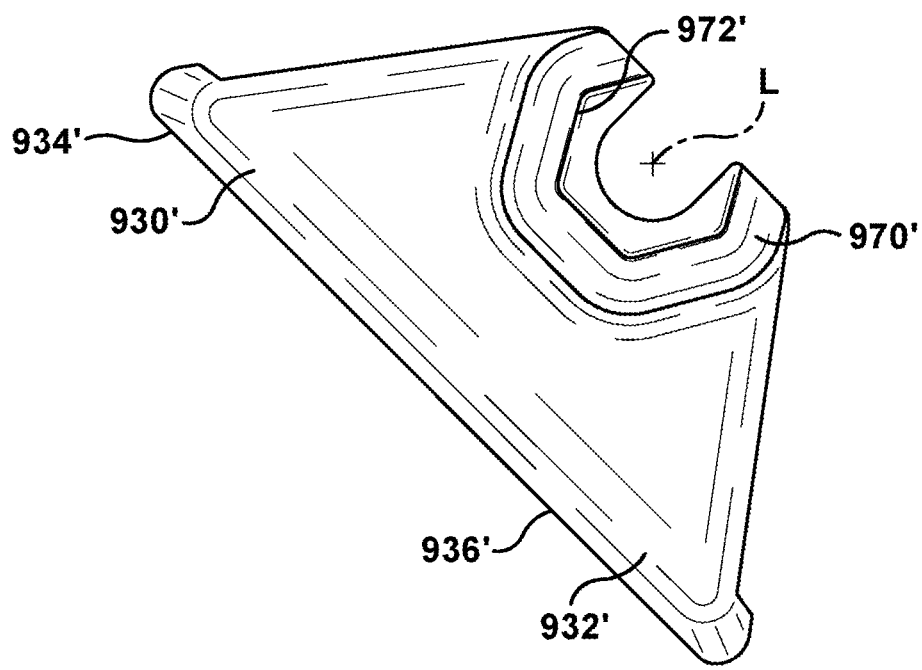
FIG. 11a is an orthographic bottom-view illustrating the support member of FIG. 9a showing aspects of the further example embodiment.

FIG. 9 is an isometric diagram illustrating a support member 900 in accordance with an aspect of an example embodiment. FIG. 10 is an orthographic top-view illustrating the support member 900 of FIG. 9 showing aspects of the example embodiment, and FIG. 11 is an orthographic bottom-view illustrating the support member 900 of FIG. 9 showing further aspects of the example embodiment. With reference now to those Figures, a support member 900 in accordance with an example embodiment is illustrated including an elongate body member 900 having opposite first 902 and second 904 ends. The elongate body member 900 defines a longitudinal axis L between the opposite first 902 and second 904 ends.

Further in accordance with the example embodiment, the support member 200 includes a component interface portion 950 formed on the first end 902 of the elongate body member 900, and an enclosure interface portion 960 formed on the second end 904 of the elongate body member 900.

The component interface portion 950 defines, in accordance with the example embodiment, a first connection region 952 for selective connection of the first end 902 of the elongate body member 900 with an associated component (not shown) to be located in the enclosure 100.

The enclosure interface portion 960, in accordance with the example embodiment, defines a non-circular cylindrical locating region 962 on the second end 904 of the elongate body member 900 for selective engagement of the second end 904 of the elongate body member 900 with a corresponding oppositely formed non-circular cylindrical locating region 130 on the base 112 of the associated enclosure 100.

In accordance with the example embodiment, the selective engagement between the non-circular cylindrical locating region 962 of the enclosure interface portion 960 and the oppositely formed non-circular cylindrical locating region 130 on the base 112 of the associated enclosure 100 prevents rotational movement of the elongate body member 900 about the longitudinal axis L relative to the associated enclosure 100.

In one form, the enclosure interface portion 960 comprises an annular wall 970 on the second end 904 of the elongate body member 900, and in another example embodiment, the enclosure interface portion 960 comprises a boss (need drawing) on the second end 904 of the elongate body member 900. In the example embodiment illustrated in FIGS. 9-11, however, the non-circular cylindrical locating region 962 on the second end 904 of the elongate body member 900 is defined by plural inwardly directed surfaces 972 of the annular wall 970 for selective engagement with a corresponding plurality of oppositely formed outwardly directed surfaces 972' defined by the boss 132 on the base 112 of the enclosure 100.

Further in accordance with the example embodiment, the non-circular cylindrical locating region 962 of the support member 200 has a hexagonal shape in a direction transverse the longitudinal axis L of the elongate body member 900.

In one form, the plural inwardly directed surfaces 972 of the annular wall 970 extend in parallel with the longitudinal axis L of the elongate body member 900. In another form, the plural inwardly directed surfaces 972 of the annular wall 970 define a truncated cone having a hexagonal shape in a direction transverse the longitudinal axis L of the elongate body member 900. The truncated cone reduces in size in a direction along the longitudinal axis L from the first end 902 of the elongate body member 900 towards the second end 904 of the elongate body member 900.

As shown in the figures, the enclosure interface portion of the support member 200 defines an aperture 980 configured to selectively receive an associated fastener (not shown) therethrough for selectively fastening the second end 904 of the elongate body member 900 with the locating region 130 on the base 112 of the enclosure 100. In its preferred form, the aperture 980 defined by the enclosure interface portion 960 permits the associated fastener (not shown) to extend through the enclosure interface portion 960 and within the annular wall 970.

In a further preferred form of the example embodiment, a support member 200 is provided for use in an associated enclosure 100 in the form of a box 110 having a base 112, four sidewalls 120,122,124,126 extending from the base 112, and an open end 140 which may be closed by a lid 142 for covering items located in the enclosure. The support member 200 in accordance with example includes an elongate body member 900 having opposite first 902 and second 904 ends and defining a longitudinal axis L between the opposite first and second ends, a component interface portion 950 formed on the first end 902 of the elongate body member 900, and an enclosure interface portion 960 formed on the second end 904 of the elongate body member 900. The component interface portion defines a first connection region 952 for selective connection of the first end of the elongate body member with an associated component to be located in the associated enclosure 100, and the enclosure interface portion defines a non-circular cylindrical locating region 962 on the second end of the elongate body member for selective engagement of the second end of the elongate body member with a corresponding oppositely formed non-circular cylindrical locating region 130 on the base 112 of the associated enclosure 100. It is to be appreciated that the selective engagement between the non-circular cylindrical locating region 962 of the enclosure interface portion 960 and the oppositely formed non-circular cylindrical locating region 130 on the base 112 of the associated enclosure 100 prevents rotational movement of the elongate body member 900 about the longitudinal axis L relative to the associated enclosure 100.

In one form the enclosure interface portion 960 of the support member comprises an annular wall 970 on the second end 904 of the elongate body member 900, and the non-circular cylindrical locating region 962 on the second end of the elongate body member is defined by plural inwardly directed surfaces 972 of the annular wall 970 adapted for selective engagement with a corresponding plurality of oppositely formed outwardly directed surfaces 133 defined by a boss 132 on the base 112 of the associated enclosure 100. In another form, equivalently, the enclosure interface portion comprises a boss on the second end 904 of the elongate body member 900, and the non-circular cylindrical locating region 962 on the second end 904 of the elongate body member 900 is defined on plural outwardly directed surfaces of the boss for selective engagement with a corresponding plurality of oppositely formed inwardly directed surfaces defined by a recess in the base 112 of the associated enclosure 100.

In one form, the non-circular cylindrical locating region 962 of the support member has a hexagonal shape in a direction transverse the longitudinal axis L of the elongate body member. In the example embodiment shown, the plural inwardly directed surfaces 972 of the annular wall 970 extend in parallel with the longitudinal axis L of the elongate body member 900. However, it is to be appreciated that the plural inwardly directed surfaces 972 of the annular wall 970 may define a truncated cone having a hexagonal shape in a direction transverse the longitudinal axis L of the elongate body member 900, wherein the truncated cone reduces in size in a direction along the longitudinal axis L from the first end 902 of the elongate body member towards the second end 904 of the elongate body member.

As illustrated, the enclosure interface portion 960 defines an aperture 980 configured to selectively receive an associated fastener (not shown) therethrough for selectively fastening the second end 904 of the elongate body member 900 with the locating region 130 on the base 112 of the associated enclosure 100. The aperture 980 defined by the enclosure interface portion 960 permits the associated fastener to extend through the enclosure interface portion 960 and within the annular wall 970.

In the embodiment wherein the enclosure interface portion of the support member comprises a boss on the second end 904 of the elongate body member 900, the non-circular cylindrical locating region 962 on the second end 904 of the elongate body member 900 is preferably defined on plural outwardly directed surfaces of the boss for selective engagement with a corresponding plurality of oppositely formed inwardly directed surfaces defined by a recess in the base 112 of the associated enclosure 100. The non-circular cylindrical locating region 962 preferably has a hexagonal shape in a direction transverse the longitudinal axis L of the elongate body member 900.

The plural outwardly directed surfaces of the boss in this embodiment preferably extend in parallel with the longitudinal axis L of the elongate body member 900. However, the plural outwardly directed surfaces of the boss may define a truncated cone having a hexagonal shape in a direction transverse the longitudinal axis L of the elongate body member 900, the truncated cone reducing in size in a direction along the longitudinal axis L from the first end 902 of the elongate body member 900 towards the second end 904 of the elongate body member 900.

The enclosure interface portion of the support member according to this embodiment claim 7, defines an aperture 980 configured to selectively receive an associated fastener therethrough for selectively fastening the second end 904 of the elongate body member 900 with the locating region 130 on the base 112 of the associated enclosure 100, the aperture 980 defined by the enclosure interface portion 960 permitting the associated fastener to extend through the enclosure interface portion 960 and within the boss.

With still continued reference to FIGS. 9-11, in accordance with the example embodiment illustrated, the elongate body member 900 of the support member 200 defines first 930 and second 932 walls extending substantially in parallel with the longitudinal axis L.

The first wall 930 defines a first alignment surface 934 being configured for abutting contact with a first sidewall of the four sidewalls 120-126 of the enclosure 100 when the non-circular cylindrical locating region 962 is selectively engaged with the corresponding oppositely formed non-circular cylindrical locating region 130 on the base 112 of the enclosure 100.

Similarly, the second wall 932 of the elongate body member 900 defines a second alignment surface 936 being configured for abutting contact with a second sidewall of the four sidewalls 120-126 of the enclosure 100 when the non-circular cylindrical locating region 962 is selectively engaged with the corresponding oppositely formed non-circular cylindrical locating region 130 on the base 112 of the enclosure 100.

Figure 9A:
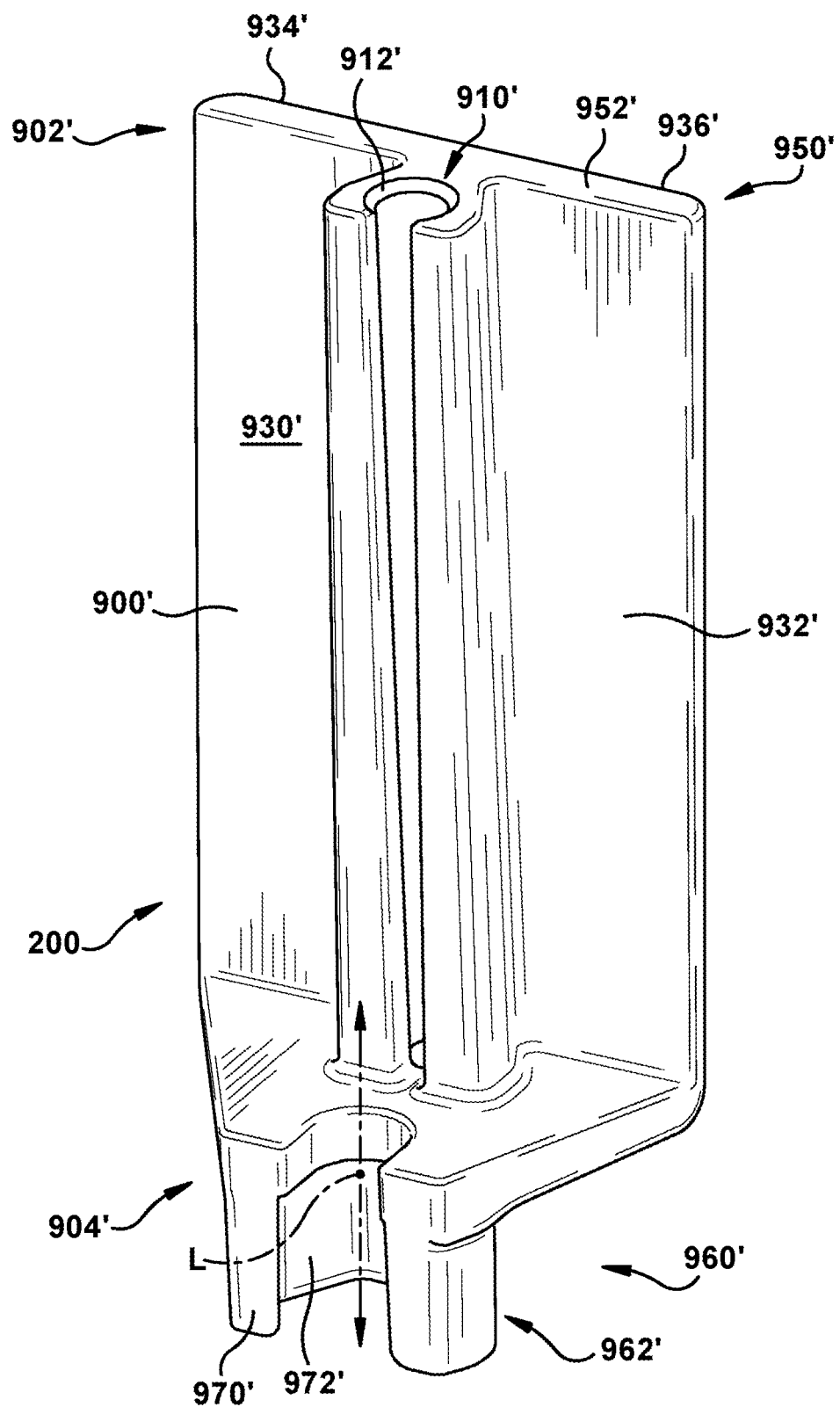
FIG. 9a is an isometric diagram illustrating a support member in accordance with an aspect of a further example embodiment wherein first and second sidewalls defined by the body of the support member are mutually co-planar.

Preferably and as illustrated in the example embodiment shown in FIG. 9, the first and second sidewalls 930, 932 defined by the elongate body member 900 extend in parallel with the longitudinal axis L of the body member 900 and are mutually perpendicular. Similarly preferably and as illustrated in the example embodiment shown in FIG. 9a, the first and second sidewalls 930', 932' defined by the elongate body member 900' extend in parallel with the longitudinal axis L of the body member 900' and are mutually co-planar.

In the preferred form illustrated, the elongate body member 900 of the support member 200 defines a first wall 930 extending substantially in parallel with the longitudinal axis L. The first wall 930 defines a first alignment surface 934 configured for abutting contact with a first sidewall 120 of the four sidewalls 120, 122, 124, 126 of the associated enclosure when the non-circular cylindrical locating region 962 is selectively engaged with the corresponding oppositely formed non-circular cylindrical locating region 130 on the base 112 of the associated enclosure 100. The elongate body member 900 further defines a second wall 932 extending substantially in parallel with the longitudinal axis L. The second wall 932 defines a second alignment surface 936 configured for abutting contact with a second sidewall 122 of the four sidewalls 120, 122, 124, 126 of the associated enclosure when the non-circular cylindrical locating region 962 is selectively engaged with the corresponding oppositely formed non-circular cylindrical locating region 130 on the base 112 of the associated enclosure 100, It is to be appreciated that the selective engagement between the non-circular cylindrical locating region 962 of the enclosure interface portion 960 and the oppositely formed non-circular cylindrical locating region 130 on the base 112 of the associated enclosure 100 together with the selective abutting contact between first and second alignment surfaces 934, 936 with the first and second sidewalls 120, 122 of the four sidewalls 120, 122, 124, 126 of the associated enclosure 100 when the non-circular cylindrical locating region 962 is selectively engaged with the corresponding oppositely formed non-circular cylindrical locating region 130 on the base 112 of the associated enclosure 100 prevents the rotational movement of the elongate body member 900 about the longitudinal axis L relative to the associated enclosure 100.

In the example embodiment illustrated in FIG. 9, the first 930 and second 932 walls defined by the elongate body member 900 are mutually perpendicular. In the example embodiment illustrated in FIG. 9a, the first 930' and second 932' walls defined by the elongate body member 900' are mutually co-planar for selective engagement with one or the sidewalls 120, 122, 124, 126 thereby preventing the rotational movement of the elongate body member 900 about the longitudinal axis L relative to the associated enclosure 100.

A channel region 910 is defined on the elongate body member 900 along the longitudinal axis L between the first 930 and second 932 mutually perpendicular walls. The channel region 910 is configured to selectively receive an associated fastener at the first connection region 952 of the component interface portion 950 formed on the first end 902 of the elongate body member 900 for the selective connection of the first end 902 of the elongate body member 900 with the associated component to be located in the enclosure such as, for example, a face plate. As illustrated, the channel region 910 comprises first 912 and second 914 spaced apart mutually facing inwardly curved walls defined on the elongate body member 900 along the longitudinal axis L between the first 930 and second (932) mutually perpendicular walls for receiving an attachment member such as a screw or the like for connecting an associated face plate with the support member.

With still continued reference to FIGS. 9-11, in accordance with the example embodiment illustrated, the elongate body member 900 of the support member 200 defines a channel region 910 extending substantially in parallel with the longitudinal axis L between the first 902 and second 903 ends. The channel region 910 is configured to selectively receive an associated fastener at the first connection region 952 of the component interface portion 950 formed on the first end 902 of the elongate body member 900 for the selective connection of the first end 902 of the elongate body member 900 with the associated component to be located in the enclosure. As described above, the elongate body member defines a first wall 940 extending substantially in parallel with the longitudinal axis L and on a side of the elongate body member opposite the channel region. The first wall 940 defines a first alignment surface 942 configured for abutting contact with a first sidewall 120 of the four sidewalls 120, 122, 124, 126 of the associated enclosure 100 when the non-circular cylindrical locating region 962 is selectively engaged with the corresponding oppositely formed non-circular cylindrical locating region 130 on the base 112 of the associated enclosure.

In the example embodiment shown, the channel region 910 comprises first 912 and second 914 spaced apart mutually facing inwardly curved walls defined on the elongate body member 900 along the longitudinal axis L and on a side of the elongate body member opposite the first wall.

The channel region 910 is defined on the elongate body member along the longitudinal axis L between the first and second mutually perpendicular sidewalls 930, 932, and is configured to selectively receive an associated fastener (not shown) at the first connection region 952 of the component interface portion 950 formed on the first end 902 of the elongate body member 900 for the selective connection of the first end 902 of the elongate body member 900 with an associated component such as for example a component face plate (not shown) to be located within the enclosure 100.

In its preferred form, the channel region 910 comprises first and second spaced apart curved walls 912, 914 defined on the elongate body member 900 along the longitudinal axis 900 between the first 930 and second 932 mutually perpendicular sidewalls. A gap 916 defined between the first and second spaced apart curved walls 912, 914 is configured to receive the associated fastener (not shown) at the first connection region 952 of the component interface portion 950 formed on the first end 902 of the elongate body member 900 for the selective connection of the first end 902 of the elongate body member 900 with the associated face plate component (not shown) to be located within the enclosure 100.

In a further form of the example embodiment, a support member 200 is provided for use in an associated enclosure 100 in the form of a box 110 having a base 112, four sidewalls 120, 122, 124, 126 extending from the base 112, and an open end 140 which may be closed by a lid 142 for covering items located in the enclosure. A particular form of the support member 200 includes an elongate body member 900 having opposite first 902 and second 904 ends and defining a longitudinal axis L between the opposite first and second ends, the elongate body member 900 defining first and second walls 930, 932 extending substantially in parallel with the longitudinal axis L, a component interface portion 950 formed on the first end 902 of the elongate body member 900, and an enclosure interface portion 960 formed on the second end 904 of the elongate body member 900. The component interface portion defines a first connection region 952 for selective connection of the first end of the elongate body member with an associated component to be located in the associated enclosure 100. Further, the enclosure interface portion defines a locating region 962 on the second end of the elongate body member for selective engagement of the second end of the elongate body member with a corresponding oppositely formed locating region 130 on the base 112 of the associated enclosure 100. Overall, the first wall 930 of the elongate body member 900 defines a first alignment surface 934 configured for abutting contact with a first sidewall 120 of the four sidewalls 120, 122, 124, 126 of the associated enclosure when the locating region 962 of the enclosure interface portion 960 is selectively engaged with the corresponding oppositely formed locating region 130 on the base 112 of the associated enclosure 100. Further overall, the second wall 932 of the elongate body member 900 defines a second alignment surface 936 configured for abutting contact with a second sidewall 122 of the four sidewalls 120, 122, 124, 126 of the associated enclosure when the locating region 962 of the enclosure interface portion 960 is selectively engaged with the corresponding oppositely formed locating region 130 on the base 112 of the associated enclosure 100. It is to be appreciated that the selective abutting contact between first and second alignment surfaces 934, 936 with the first and second sidewalls 120, 122 of the four sidewalls 120, 122, 124, 126 of the associated enclosure 100 prevents rotational movement of the elongate body member 900 about the longitudinal axis L relative to the associated enclosure 100

In one form, the enclosure interface portion 960 formed on the second end 904 of the elongate body member 900 defines a non-circular cylindrical locating region 962 on the second end of the elongate body member for selective engagement of the second end of the elongate body member with a corresponding oppositely formed non-circular cylindrical locating region 130 on the base 112 of the associated enclosure 100. It is to be appreciated that the selective engagement between the non-circular cylindrical locating region 962 of the enclosure interface portion 960 and the oppositely formed non-circular cylindrical locating region 130 on the base 112 of the associated enclosure 100 together with the selective abutting contact between first and second alignment surfaces 934, 936 with the first and second sidewalls 120, 122 of the four sidewalls 120, 122, 124, 126 of the associated enclosure 100 prevents the rotational movement of the elongate body member 900 about the longitudinal axis L relative to the associated enclosure 100.

Although specific embodiments of the support member and of the enclosure interface portions of the support member and of the base of the box have been shown for illustrative purposes, it is understood that features from the examples may be combined or substituted with each other and their equivalents. Further, any number of support member(s) and component interface portion(s) may be implemented in a single enclosure.

In addition, any fastener used in an embodiment of the present invention may comprise a self-tapping set screw which engages the inside wall of the holes or apertures when inserted therein. Alternatively, the holes and apertures may be threaded to receive a particular type and/or size threaded fastener. Alternatively, the holes and apertures may be sized and shaped to accept a plastic or other deformable pin fastener. Any combination of the above types of fasteners and corresponding holes and apertures is also possible.

Although the example embodiments have been shown and described with respect to certain preferred structures, it is to be understood that equivalents and modifications will occur to others skilled in the art upon the reading and understanding of the specification. The present claimed invention includes all such equivalents and modifications, and is limited only by the scope of the following claims.

The invention claimed is:

1. An enclosure system (100) comprising:
   a box (110) comprising:
   a base (112); and
   four sidewalls (120, 122, 124, 126) extending from the base (112), the base (112) and the four sidewalls (120, 122, 124, 126) defining an open end (140) which may be closed by a lid (142) for covering items/components located in the box (110); and
   a support member (200) comprising:
   an elongate body member (900) having opposite first (902) and second (904) ends and defining a longitudinal axis L between the opposite first and second ends;
   a component interface portion (950) formed on the first end (902) of the elongate body member, the component interface portion defining a first connection region (952) for selective connection of the first end of the elongate body member with an associated component to be located in the box (110); and
   an enclosure interface portion (960) formed on the second end (904) of the elongate body member, the enclosure interface portion (960) defining a locating region (962) on the second end (904) of the elongate body member for selective engagement of the second end of the elongate body member with a corresponding oppositely formed locating region (130) on the base of the box.

2. The enclosure system according to claim 1, wherein: the enclosure interface portion (960) defines a non-circular cylindrical locating region (962) on the second end (904) of the elongate body member for selective engagement of the second end of the elongate body member with a corresponding oppositely formed non-circular cylindrical locating region (130) on the base of the box,
wherein the selective engagement between the non-circular cylindrical locating region (962) of the enclosure interface portion (960) and the oppositely formed non-circular cylindrical locating region (130) on the base (112) of the box (110) prevents rotational movement of the elongate body member (900) about the longitudinal axis L relative to the box.

3. The enclosure system according to claim 2, wherein:
the enclosure interface portion (960) comprises an annular wall (970) on the second end (904) of the elongate body member (900); and
the non-circular cylindrical locating region (962) on the second end of the elongate body member is defined by plural inwardly directed surfaces (972) of the annular wall (970) adapted for selective engagement with a corresponding plurality of oppositely formed outwardly directed surfaces (133) defined by a boss (132) on the base (112) of the box (110).

4. The enclosure system according to claim 2, wherein:
the enclosure interface portion comprises a boss on the second end (904) of the elongate body member (900); and
the non-circular cylindrical locating region (962) on the second end (904) of the elongate body member is defined on plural outwardly directed surfaces of the boss for selective engagement with a corresponding plurality of oppositely formed inwardly directed surfaces defined by a recess in the base (112) of the box (110).

5. The enclosure system according to claim 1, wherein:
the elongate body member defines a first wall (930) extending substantially in parallel with the longitudinal axis L, the first wall defining a first alignment surface (934) being configured for abutting contact with a first sidewall (120) of the four sidewalls (120, 122, 124, 126) of the box when the locating region (962) is selectively engaged with the corresponding oppositely formed locating region (130) on the base of the box;
the elongate body member defines a second wall (932) extending substantially in parallel with the longitudinal axis L, the second wall defining a second alignment surface (936) being configured for abutting contact with a second sidewall (122) of the four sidewalls (120, 122, 124, 126) of the box when the locating region (962) is selectively engaged with the corresponding oppositely formed locating region (130) on the base of the box,
wherein the selective abutting contact between first and second alignment surfaces (934, 936) with the first and second sidewalls (120, 122) of the four sidewalls (120, 122, 124, 126) of the box (110) when the locating region (962) is selectively engaged with the corresponding oppositely formed locating region (130) on the base (112) of the box (110) prevents the rotational movement of the elongate body member (900) about the longitudinal axis L relative to the box (110).

6. The enclosure system according to claim 1, wherein:
the enclosure interface portion (960) defines a non-circular cylindrical locating region (962) on the second end (904) of the elongate body member for selective engagement of the second end of the elongate body member with a corresponding oppositely formed non-circular cylindrical locating region (130) on the base (112) of the box (110);

the elongate body member (900) defines a first wall (930) extending substantially in parallel with the longitudinal axis L, the first wall (930) defining a first alignment surface (934) being configured for abutting contact with a first sidewall (120) of the four sidewalls (120, 122, 124, 126) of the box (110) when the non-circular cylindrical locating region (962) is selectively engaged with the corresponding oppositely formed noncircular cylindrical locating region (130) on the base (112) of the box (110); and the elongate body member (900) defines a second wall (932) extending substantially in parallel with the longitudinal axis L, the second wall (932) defining a second alignment surface (936) being configured for abutting contact with a second sidewall (122) of the four sidewalls (120, 122, 124, 126) of the box (110) when the noncircular cylindrical locating region (962) is selectively engaged with the corresponding oppositely formed non-circular cylindrical locating region (130) on the base (112) of the box (110), wherein the selective engagement between the non-circular cylindrical locating region (962) of the enclosure interface portion (960) and the oppositely formed non-circular cylindrical locating region (130) on the base (112) of the box (110) together with the selective abutting contact between first and second alignment surfaces (934, 936) with the first and second sidewalls (120, 122) of the four sidewalls (120, 122, 124, 126) of the box (110) when the non-circular cylindrical locating region (962) is selectively engaged with the corresponding oppositely formed non-circular cylindrical locating region (130) on the base (112) of the box (110) prevents the rotational movement of the elongate body member (900) about the longitudinal axis L relative to the box (110).

* * * * *